March 7, 1961  H. L. FISHER ET AL  2,974,227
ANALYZER
Filed May 7, 1958  2 Sheets-Sheet 1

INVENTORS
H.L. FISHER
E.C. MILLER
BY Hudson & Young
ATTORNEYS

March 7, 1961 H. L. FISHER ET AL 2,974,227
ANALYZER
Filed May 7, 1958 2 Sheets-Sheet 2

TO RECORDER 41

INVENTORS
H. L. FISHER
E. C. MILLER
BY Hudson & Young
ATTORNEYS

United States Patent Office 2,974,227
Patented Mar. 7, 1961

2,974,227

ANALYZER

Horace L. Fisher and Elmer C. Miller, Bartlesville, Okla., assignors to Phillips Petroleum Company, a corporation of Delaware Filed May 7, 1958, Ser. No. 733,558

1 Claim. (Cl. 250—43.5)

This invention relates to method and apparatus for detecting the presence of materials that absorb electromagnetic radiation of selected wave lengths. In one specific embodiment it provides method and apparatus for photometrically detecting nitrogen dioxide.

It has been previous practice in photometric analysis to provide one source of radiation and to direct two beams therefrom, one through a standard or reference cell and the other beam of radiation through a sample cell. The substance being analyzed is passed through the sample cell. The reference cell compensates for variations in light source intensity, among other things. The problem with thus using two cells is that each of the cells clogs or collects dirt and dust at a different rate and therefore constitutes a source of error for which it is difficult to correct.

The instant invention provides an analyzer having an optical system wherein the beam of light passes through only one cell and is thereafter split into a reference and a measuring beam. This construction permits both cells to be subject to identical changes in the total quantity of light received, whether the light received varies due to fluctuations in light source intensity or due to accumulations of dirt.

Accordingly, it is an object of this invention to provide a method and apparatus for photometrically analyzing with one cell yet with two beams. It is still a further object to provide method and apparatus for such analysis as applied to determining the concentration of nitrogen dioxide in a fluid mixture.

In the drawings:

Figure 1 represents a nitric acid plant employing an analyzer embodying the instant invention;

Figure 2 presents the optical system of the instant analyzer;

Figure 1:
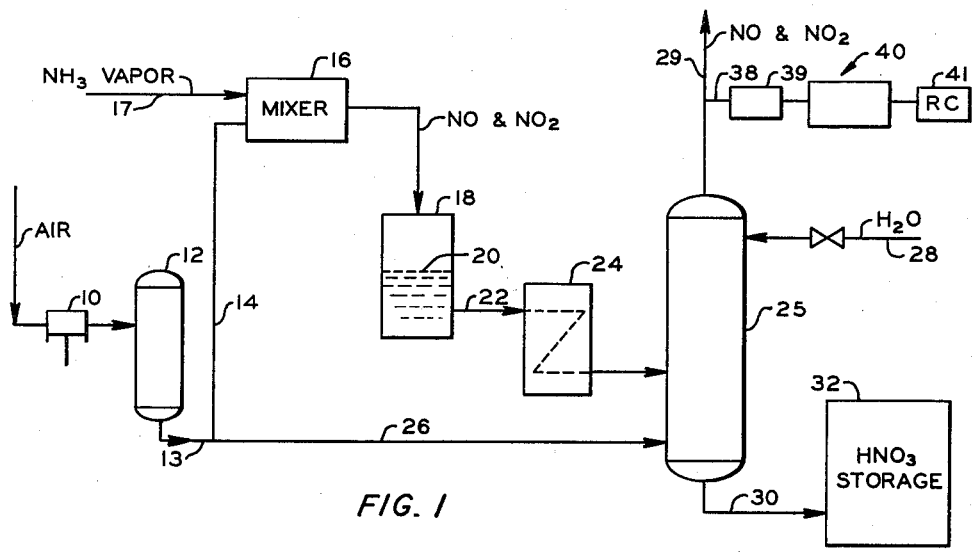

Referring now to Figure 1, air is compressed in an air compressor 10 which is preferably of the centrifugal variety and is delivered to a receiver 12 from which the air flows through conduit 13 and conduit 14 to a mixer 16 where it is mixed with ammonia vapor supplied through a conduit 17. The mixture goes from the mixer to the ammonia oxidation unit 18 where it is reacted in the presence of a platinum gauze catalyst 20 to form principally nitrogen oxide and water. The reaction products pass through a conduit 22 to a cooling apparatus 24, then to an absorber 25 where they are mixed with water and air provided through conduits 28 and 26, respectively. The liquid reaction products in the form of concentrated nitric acid is removed through the conduit 30 to storage apparatus 32. The gaseous reaction products pass from the top of the absorber 25 through a vent line 29. Associated with the vent line 29 is a sample line 38 having an oxidizing chamber 39 therein to provide samples to an analyzer 40. The chamber 39 converts the nitrogen oxide (NO) to the dioxide ($NO_2$) so that the analyzer can measure the total of both said oxides in the vent gases. The measurement obtained by the analyzer 40 can be recorded by a recorder or recorder controller 41.

Figure 2:
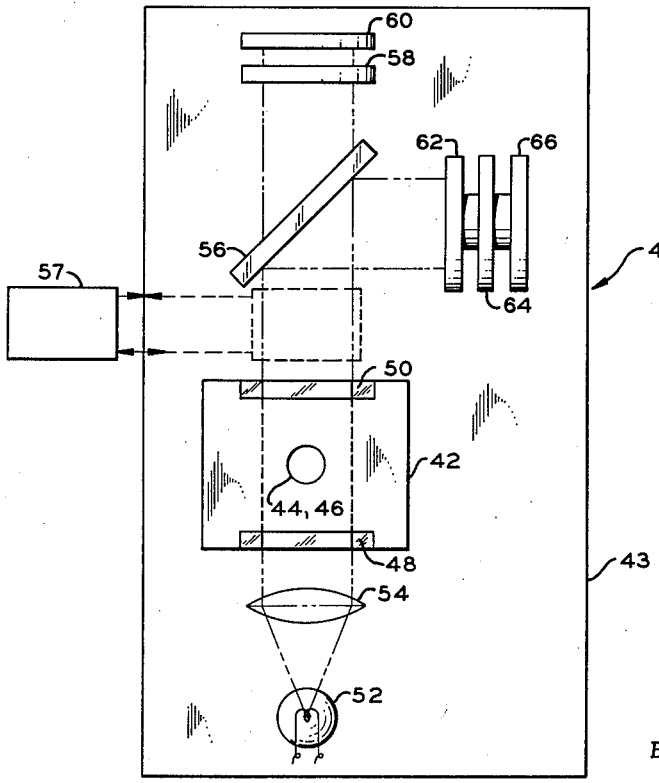

Referring now to Figure 2, there is shown the optical system for the analyzer 40. A sample cell 42 is supported on a base 43. The cell 42 receives, through inlet 44 and outlet 46, the sample provided by line 38. The cell is provided with transparent windows 48 and 50 made of Plexiglas which are manufactured by the Rohm and Haas Co., Philadelphia 5, Pennsylvania. A radiation source 52, in the embodiment shown comprising a mercury vapor source, provides radiation in the visible and near ultraviolet range. Between the radiation source and the sample cell is a collimating lens 54. After the beam has passed through the sample cell it strikes a light divider 56. The light divider is preferably constructed from clear transparent plate glass. In any event, the light divider reflects about ten percent of the light and transmits about 90 percent of the light. In the embodiment shown the light divider is disposed obliquely to the beam of light striking at the angle being such as to reflect and transmit the percentages stated. As shown, the angle of 45° is used. A standardization filter 57 may be provided to adjust the bridge. Filter 57 may be a Corning 3–94 filter which has a transmissibility equal to some known nitrogen dioxide concentration within the operating range of the analyzer. For example, if the analyzer reads 0–10% nitrogen dioxide, the filter may indicate 9% nitrogen dioxide. The filter 57 is manually operated.

The transmitted light first strikes an interference filter 58 which is selected to remove all wave lengths except those in the range of 370 to 440 millimicorns. Actually the filter 58 is selected to provide a peak transmissibility in the region of 405 millimicorns. This filter may be a number 33–79–40 as manufactured by Bausch and Lomb Optical Company, Rochester, New York. The material actually used for filter 58 has a peak transmissibility at the wave length of 405 millimicrons ±2 millimicrons and a half band width of 12 millimicrons; fringe effects extended the range of the filter to include that stated above. The filter 58 is disposed between the light divider 56 and a sample photocell 60. The photocell may be a model 856, type 1 as described in circular B–27–F, February 1957, of the Weston Electrical Instrument Corporation, Newark 12, New Jersey.

An iris diaphragm 62 constitutes a light stop for use in balancing the light beams when a non-absorber is present in the sample cell. In normal operation during analysis the iris 62 is open, and light passing therethrough strikes a filter 64 and then impinges upon the reference photocell 66. The filter 64 may be a Corning 3–71 filter such as manufactured by the Corning Glass Works, Corning, New York. Preferably this filter is of the "sharp cut-off" variety and in the embodiment shown cuts off the transmissibility below wave lengths of 440 millimicrons to where such wave lengths represent 0.5 percent of the radiation passed.

In operation the light intensity of the 90 percent or measuring beam is reduced to about 10 percent by means of the light filter 58 which discriminates against all wave lengths other than those in the range 370–440 millimicrons. This filter reduces the intensity of the sample photocell 60 to about the level of that at the reference detector 66. Further, the reduction in light intensity by filtering makes the energy at the sample photocell dependent on the nitrogen dioxide concentration present in the sample cell. The reference cell 66 is responsive only to changes in light intensity. As mentioned above, the use of the filter 64 is an optional refinement because the amount of 405 millimicrons wave lengths in the reflected light is quite small and changes therein will not substantially effect the reference photocell 66.

Figure 3:
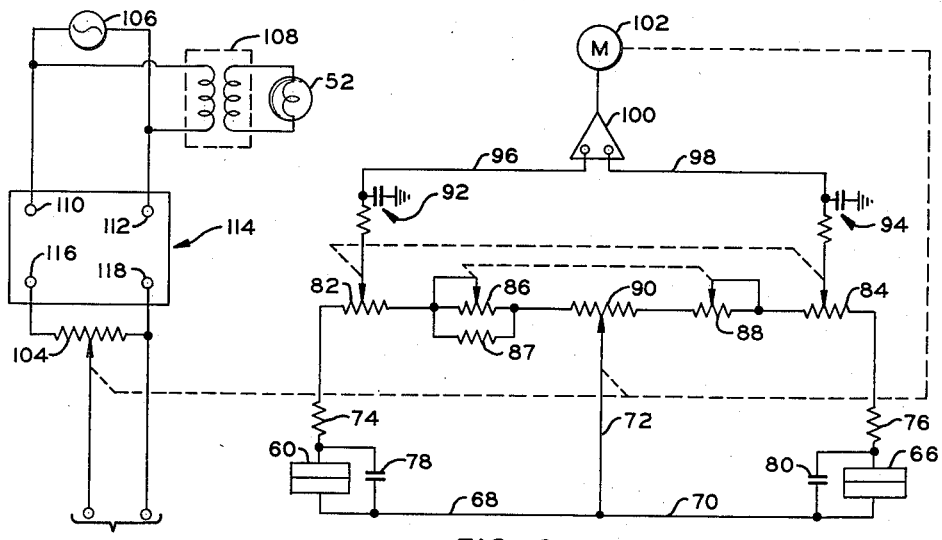
Figure 3 represents an improved bridge used with the instant analyzer.

In Figure 3 there is shown a bridge of which cells 60 and 66 are components. These cells are self-generating and produce a signal when light impinges thereon. The signal is transmitted by the bridge to appropriate control apparatus as hereinafter described.

The cells 60 and 66 are connected through respective leads 68 and 70 to a potentiometer contactor 72. The other terminals of the respective cells are connected to resistors 74 and 76. In parallel with the cells are capacitors 78 and 80. Connected to the resistors 74 and 76 are the adjustable resistors 82 and 84, the contactors of which are ganged together to constitute a span adjusting device. Both of these resistors increase when the other increases and decrease when the other decreases.

Connected in series to the resistor 82 is a parallel circuit comprising an adjustable resistor 86 and a resistor 87 to which is connected a first terminal of the potentiometer 90 which is associated with contactor 72. The other terminal of the potentiometer is connected to an adjustable resistor 88 the contactor of which is ganged to the contactor of the resistor 86 to provide a sensitivity adjustment whereby one of said resistors increases while the other decreases. The adjustable contactors for resistors 82 and 84 constitute the output terminals for the bridge. Each of these contactors is connected to an RC filter assembly such as 92 and 94 and by means of leads 96 and 98 to an amplifier 100. The amplifier output is provided to a servo motor 102 which operates responsive thereto to adjust the contactor 72 and the telemetering potentiometer contactor 104. As shown in Figure 3, a power source 106 provides power through a transformer 108 to the radiation source 52. The same source, through input terminals 110 and 112, the transformer, heater, and rectifier circuit 114, and output terminals 116 and 118 provides power to the potentiometer 104.

In the operation of this bridge the ganged resistors 82, 84 and 86, 88 are manually adjusted for the respective span and sensitivity. When light impinges on the respective sample and reference cells 60 and 66 signals are generated which are provided through the various resistors to the output terminals at 82 and 84 and eventually to the amplifier 100. The signal from the amplifier operates the servo motor 102 which adjusts the contactor 72 in such a manner as to create a zero voltage flowing along 72. Inasmuch as 72 is ganged to the telemetering potentiometer 104 a reading can be transmitted from the latter to a recorder controller.

Figure 4:
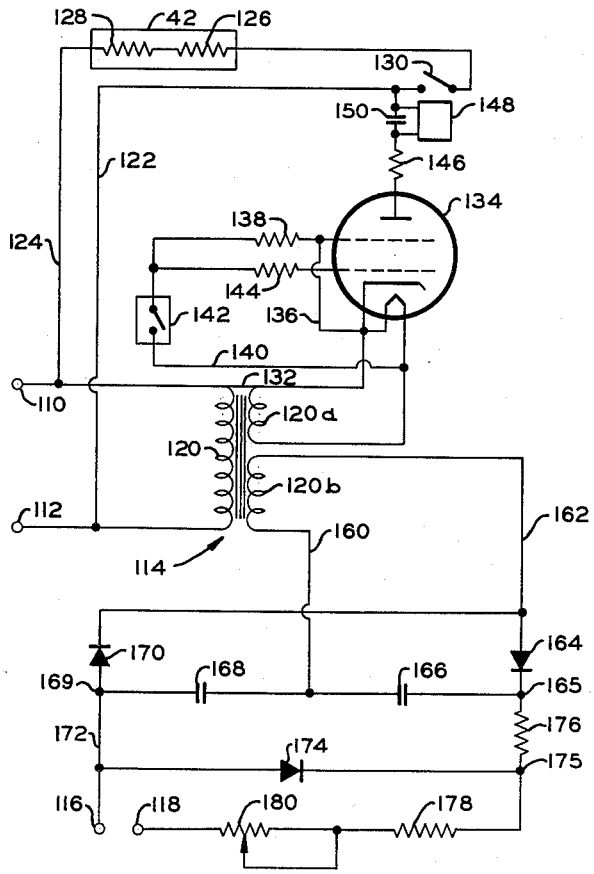
Figure 4 represents a temperature control system used with the instant analyzer.

In Figure 4 there is shown the circuit 114 in detail. The input terminals 110 and 112 are connected through power leads 122 and 124 to the series connected heaters 126 and 128 through a normally closed switch 130. The heaters are disposed in the sample cell and they constitute 30 watt 115 volt resistance heaters. They are necessary in order to supply accurate temperature control because the optical properties of a fluid being photometrically analyzed, especially gases such as nitrogen dioxide, are subject to radical change with temperature and therefore this source of error must be eliminated or reduced by means such as provided here.

The input terminals are also connected to the primary of a transformer 120, having secondary circuits 120a and 120b. A lead 132 connects the primary to the screen grid and cathode of the tetrode 134, which normally conducts. A lead 136 connects the screen grid and the cathode. A high resistance 138 connects the control grid to the cathode. A lead 140 serves to complete a bypass circuit around the high resistance 138 through a thermostatically controlled switch 142 to the control grid. A resistor 144 completes this circuit. A resistor 146 is connected in series to the anode of the tetrode between the latter and a series circuit comprising coil 148 and capacitor 150 which serves to operate the normally closed switch 130.

In the operation of the above-disclosed circuit the tetrode 134 normally conducts thereby operating the coil 148 and maintaining the switch 130 closed. This permits the heaters to be in normal operation. If the sample cell gets too hot, the thermostatic switch 142 senses a rise in temperature, for example, on the order of 1° C. above the control temperature, and closes (it being a normally open switch) thereby completing a circuit through 144 to the control grid to shut off the tetrode 134. This serves to open the switch 130 and cut off the heat being applied through the heaters 126 and 128. No heat will be supplied until the temperature drops approximately 2 degrees, i.e., one degree under control temperature, whereupon the thermostat will open and the heaters will once again be rendered operative.

The remainder of the circuit shown in Figure 4 comprises a rectifier receiving power from the secondary coil 120b to supply a D.C. signal to the telemetering potentiometer through the terminals 116 and 118. The secondary coil 120b is connected by means of leads 160 and 162 to provide A.C. to the input of rectifier. The lead 162 is connected to the diode 164 through a junction 165 to the capacitor 166. The lead 160 is connected in like manner through a capacitor 168, a junction 169, and another diode 170 to lead 162. A lead 172 connects the junction 169 to output terminal 116. A diode 174 is connected between the junction 169 and the junction 175. A resistor 176 is connected between the junction 175 and junction 165. In series between the junction 175 and the output terminal 118 are found in order the resistor 178 and the adjustable resistor 180.

To summarize the operation of the entire apparatus, the bridge is manually adjusted for span and sensitivity as described above, and power is provided to the terminals 110, 112 long enough beforehand for the sample cell to reach operating temperature. Then a sample is provided to the sample cell 48 through the sample line 38. Light then passes through the sample in the sample cell 50 to the light divider 56 and the transmitted light passes on to the photocell 60 where a signal is generated. At the same time a reflected beam of light is passed to the cell 66 where another signal is generated. These signals appear in the bridge shown in Figure 3 and are transmitted therefrom to the amplifier 100, thence to the servo motor 102. Operation of the servo motor adjusts the contactor 72 to reduce the signal on 72 to zero. This in turn adjusts the output signal from the telemetering potentiometer 104. The signal from the potentiometer 104 is transmitted to the recorder 41.

A continuous analysis is possible with this instrument. The data recorded provides an index of the total oxides of nitrogen in the sample stream. In the arrangement shown in Figure 1, the analysis indicates the total amount of stack loss in the vent gases. While this is going on, the thermostat 142 as seen in Figure 4 operates to regulate the temperature in the sample cell in order that the optical properties of the fluid being measured, here nitrogen dioxide, may be kept at a substantially constant level.

The optical filter 57 is preferred as a reference for standardization because it eliminates problems in providing very thin cells containing the actual reference fluid. In some cases the reference materials may undergo certain physical and/or cheimcal changes with respect to time. An example is butadiene—if used as a reference fluid it would polymerize, hence introduce an error in standardizing.

To avoid error due to collection of dirt thereon, the filter 57 may be disposed between two pieces of felt or other suitable soft material when not in use. The filter should be mounted on a shaft (not shown) which can be manually turned to swing the filter into position. A timer operated motor could also operate the filter to zero the apparatus periodically. The structure described in this paragraph may, of course, be provided on the analyzer housing.

While nitrogen dioxide has been used by way of example in the foregoing discussion it is to be understood that other gases and fluids may be analyzed in an apparatus such as herein disclosed. It is also to be understood that this apparatus is suitable for use in process control where the signal that appears at the output terminals of the potentiometer 104 is transmitted to a recorder controller which in turn can operate a valve or other apparatus in order to control a process variable. Further, the arrangement of optical elements in the instant apparatus is suitable for other types of analyzers, for example infrared analyzers. Appropriate changes in filter elements, cell windows, and lenses would, of course, be necessary when the structure of the instant invention is applied to the analysis of other substances at different wave lengths.

In the following claims where we use the term "in the region of" we refer to apparatus made within attainable manufacturing tolerances for carrying out the stated operation. Examples of such tolerances are stated above with reference to filters 58 and 64, but are not limited thereto.

We claim as our invention:

Analysis apparatus comprising a source of ultraviolet radiation, a sample cell, means for transmitting a sample stream containing oxides of nitrogen through said sample cell, a first filter for blocking wavelengths except those in the region of 405 millimicrons, a first photocell, means for passing a beam of radiation from said source through said sample cell and said first filter to said first photocell, a light divider comprising an uncoated transparent glass plate disposed obliquely in and making an angle of 45° with said beam of radiation between said cell and said first filter, whereby a corrosive atmosphere does not affect the relative amounts of light transmitted and reflected from said plate, a second filter for blocking wavelengths in the region of 405 millimicrons, a second photocell, and means positioning said second filter and said second photocell so that radiation reflected from said glass plate passes through said second filter to said second photocell.

References Cited in the file of this patent

UNITED STATES PATENTS

| | | |
|---|---|---|
| 1,740,673 | Whitaker et al. | Dec. 24, 1929 |
| 2,417,321 | Park et al. | Mar. 11, 1947 |
| 2,617,940 | Giguere | Nov. 11, 1952 |
| 2,654,845 | Presenz | Oct. 6, 1953 |
| 2,694,335 | Albright et al. | Nov. 16, 1954 |
| 2,737,591 | Wright et al. | Mar. 6, 1956 |
| 2,878,388 | Bergson | Mar. 17, 1959 |

FOREIGN PATENTS

| | | |
|---|---|---|
| 927,431 | Germany | May 9, 1955 |